(No Model.)  2 Sheets—Sheet 1.

VAN BRUNT MAGAW.
FERTILIZER DISTRIBUTER.

No. 306,844.  Patented Oct. 21, 1884.

WITNESSES:  INVENTOR:
Chas. Nida  Van Brunt Magaw
C. Sedgwick  BY Munn & Co.
ATTORNEYS.

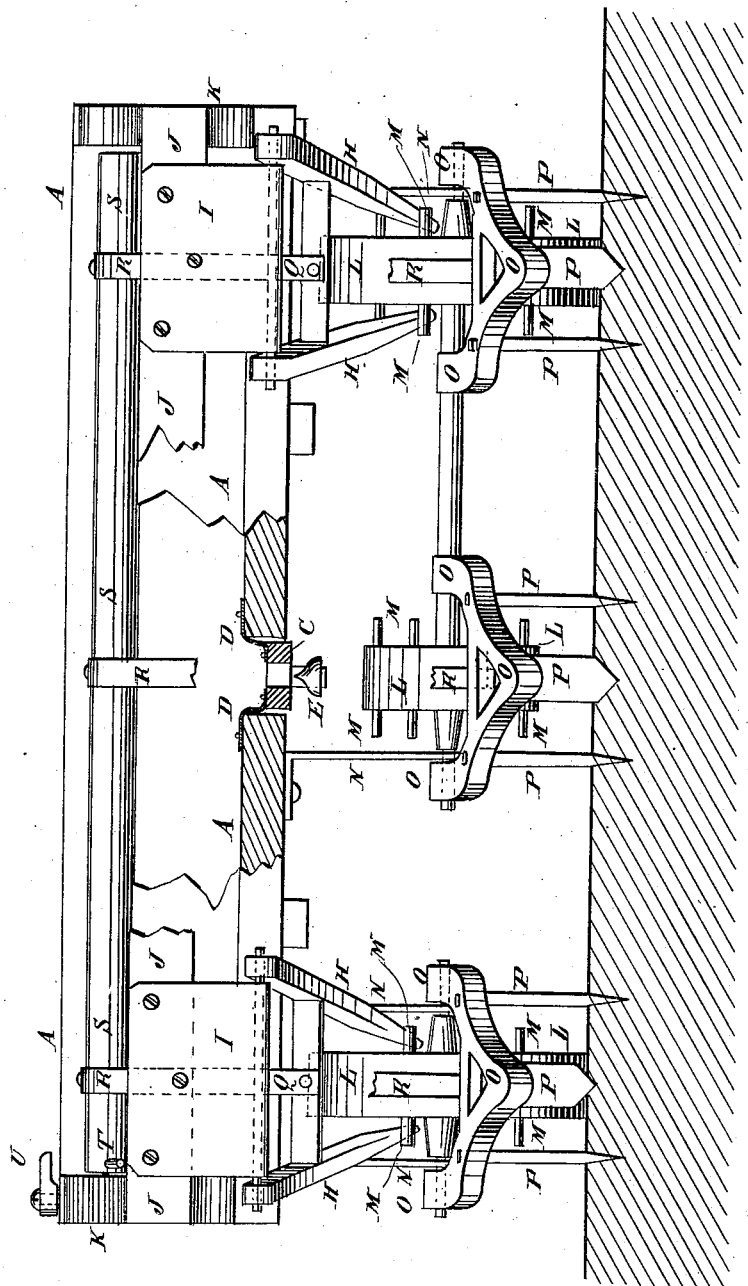

UNITED STATES PATENT OFFICE.

VAN BRUNT MAGAW, OF FLATLANDS, NEW YORK.

FERTILIZER-DISTRIBUTER.

SPECIFICATION forming part of Letters Patent No. 306,844, dated October 21, 1884.

Application filed May 5, 1884. (No model.)

*To all whom it may concern:*

Be it known that I, VAN BRUNT MAGAW, of Flatlands, in the county of Kings and State of New York, have invented a new and useful Improvement in Fertilizer - Distributers, of which the following is a full, clear, and exact description.

Reference is to be had to the accompanying drawings, forming part of this specification, in which similar letters of reference indicate corresponding parts in all the figures.

Figure 1:
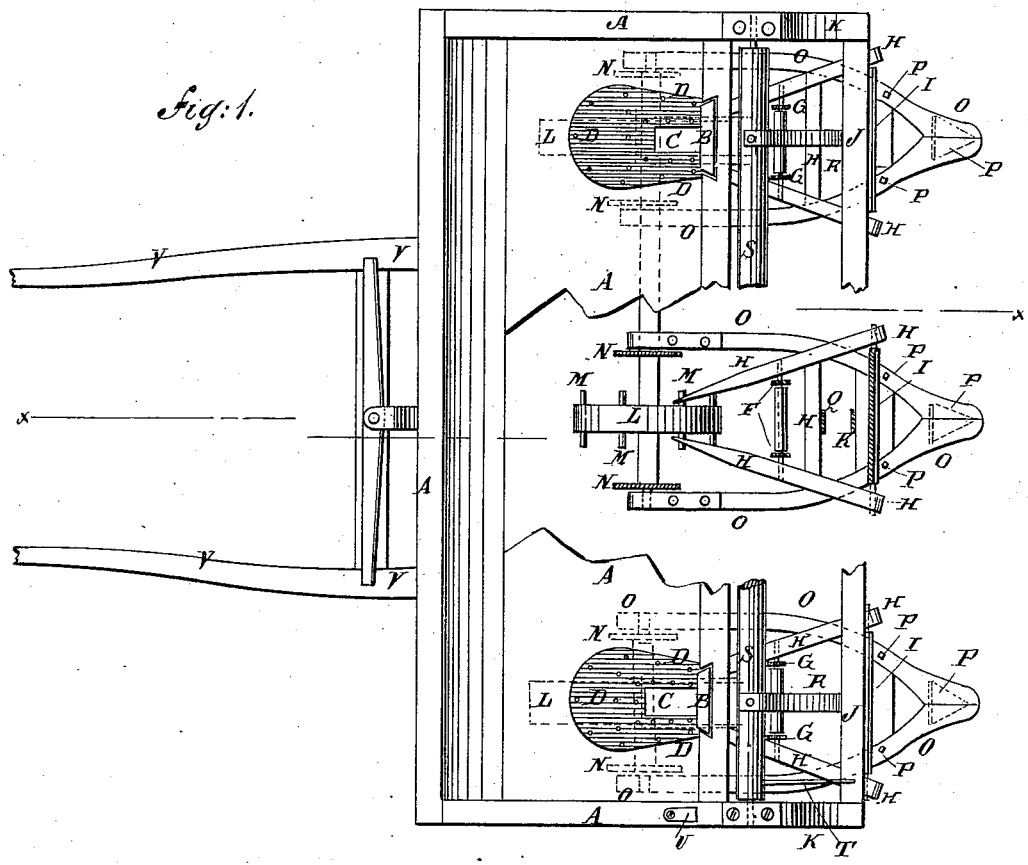
Figure 2:
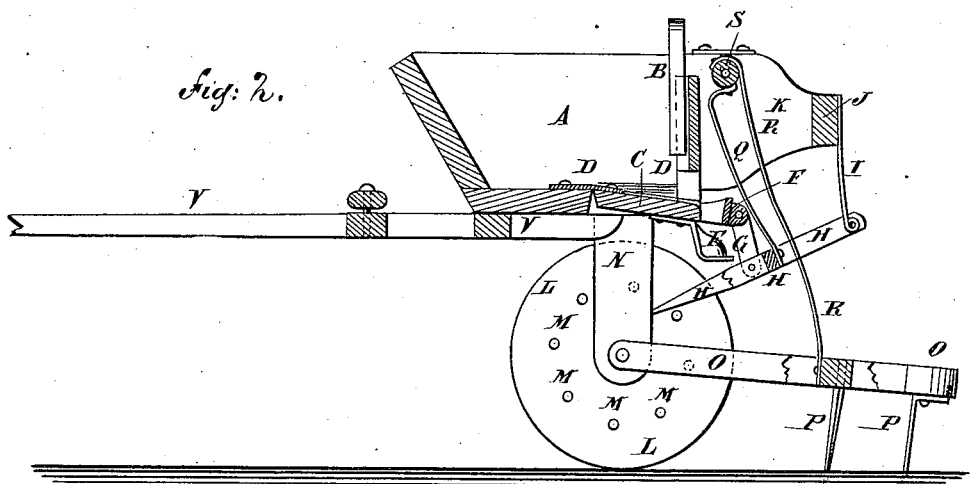

Figure 1, Sheet 1, is a plan view of my improvement, parts being broken away. Fig. 2, Sheet 1, is a sectional side elevation of the same, taken through the broken line $xx$, Fig. 1. Fig. 3, Sheet 2, is a rear elevation of the same, part being broken away.

The object of this invention is to facilitate the distribution of fertilizers and promote convenience and accuracy in such distribution.

The invention consists in the construction and arrangement of parts, as will be hereinafter fully described and claimed.

A represents the hopper or distributing-box, which is made of such a length as to discharge the fertilizer upon three rows at a time.

In the lower part of the back of the hopper A, at the center and near each end, are formed discharge-openings, the size of which can be regulated, as the fineness or coarseness of the fertilizer may require, by slides B, placed in dovetailed grooves in the inner side of the said back of the hopper A.

In the bottom of the hopper A, below and in front of the openings in its back, are formed openings, into which are fitted feed-plates C. The joints between the feed-plates C and the hopper-bottom are covered with leather, D, or other flexible material, to prevent the fertilizer from getting into said joints and clogging the said feed-plates. The forward ends of the feed-plates C are hinged to the hopper-bottom by the coverings D or other suitable hinges. As the fertilizer drops from the rear ends of the feed-plates C, it falls upon rounded or angular distributing - blocks E, secured to or formed upon brackets attached to the bottoms of the said feed-plates C, so as to scatter the fertilizer as it falls to the ground.

To the rear corners of each feed-plate C are attached lugs F, which can be connected by a bar at such a distance from the said rear end of the feed-plate as not to interfere with the escape of the fertilizer.

To the lugs F are pivoted the upper ends of two short bars, G, the lower ends of which are pivoted to the side bars of a frame, H. The rear end of the frame H is hinged to the lower end of a hanger, I, the upper end of which is attached to a cross-bar, J, secured at its ends to the rear ends of arms K, formed upon or attached to the ends of the hopper A. The frames H are tapered toward their forward ends, and the ends of their side bars project at the opposite sides of the rear upper parts of the wheels L, so as to be struck and vibrated to agitate the feed-plates C by the cross-pins M, attached to the said wheels L. The wheels L are journaled to hangers N, attached to the bottom of the hopper A, and the central wheel, L, is made smaller than the side wheels, so as not to touch the ground unless one of the said side wheels should drop into a furrow or other depression in the ground. The journal of the smaller central wheel L is rigidly connected with the journal of one of the side wheels, or formed in one piece with it, as shown in Fig. 3, so that the said smaller wheel, when out of contact with the ground, will be revolved from the side wheel with which it is connected. With this construction the dropping of one of the side wheels L into a depression in the ground will not raise the other side wheel out of contact with the ground, and thus stop its revolution, as would be the case if all three wheels L were of the same size.

To the journals of the wheels L are pivoted the forward ends of the side bars of the harrow-frames O. The rear parts of the side bars of the frames O are curved inward, and their rear ends meet and are secured to each other.

To the rear parts of the harrow-frames O are attached three or more teeth, P, the forward side ones of which are designed to cover the fertilizer, and the rear central one, which may be made wider than the others, is designed to open a channel to receive seed. With this construction the harrows O P will not be affected by the up and down movements of the thills in adjusting the machine to a larger or smaller horse.

To cross-bars of the frames H O are attached, respectively, the lower ends of two straps, cords, or chains, Q R, the upper ends of which are attached to a shaft, s, the ends of which are journaled to the upper forward parts of the arms K, so that by turning the said shaft s through a part of a revolution to wind the straps Q R upon it the frames H will be raised to take their forward ends out of contact with the pins M, and the frames O will be raised to take the harrow-teeth P out of contact with the ground, so that the machine can be readily drawn from place to place. The shaft s is turned to raise and lower the frames H O by a lever, T, attached to it near one end. When the frames H O are lowered into working position, the outer end of the lever T rests upon the cross-bar J, and when the said frames are raised from the ground the said lever T is locked in place by turning the button U, pivoted to the edge of the end of the hopper A, over the said lever.

V are the thills, which are attached to the forward middle part of the bottom of the hopper A, as shown in Figs. 1 and 2, so that the machine can be drawn by a single horse walking in the center row.

Having thus described my invention, what I claim as new, and desire to secure by Letters Patent, is—

1. In a fertilizer-distributer, the combination, with the hopper A and the side drive-wheels, of an intermediate smaller drive-wheel, substantially as herein shown and described, whereby one of the side drive-wheels can drop into a depression in the ground without affecting the operation of the machine, as set forth.

2. The combination, with the hopper A and the side drive-wheels L, mounted on separate axles, of an intermediate smaller drive-wheel secured rigidly to the same axle as one of the side wheels, substantially as described.

3. The combination, with the apertured bottom of the hopper A, of the feed-plates C and the flexible coverings D, secured to the hopper-bottom, and feed-plates to cover the spaces between the front and sides of said feed-plates and apertures, and said flexible coverings also serving as hinges to the feed-plates, substantially as set forth.

4. The combination, with the hopper A, its pivoted feed-plate C, and rearward extending arms K, having a rock-shaft, s, journaled between them, of hangers N, drive-wheels L, journaled therein, frame H, hanger I, connecting the same at their rear ends with a crossbar of arms K, intermediate link, G, connecting the rear end of the hopper with said frames, frames O, pivoted at their forward ends to the hangers N, and straps Q R, connected to the rock-shaft s and the frames H O, respectively, substantially as set forth.

5. The combination, with the hopper A, having feed-apertures, of the feed-plates C, flexible covering D, connecting said plates at their front and side edges with the hopper, and brackets provided with projections F at the lower free edge of the side plates, and the drive-wheels L and pivoted frames H, for operating the feed-plates, substantially as set forth.

VAN BRUNT MAGAW.

Witnesses:
JAMES T. GRAHAM,
C. SEDGWICK.